2,781,362
Patented Feb. 12, 1957

2,781,362

ALKYLATION PROCESS IMPROVEMENT FOR VAT DYES

Isaiah Von, Plainfield, N. J., assignor to American Cyanamid Company, New York, N. Y., a corporation of Maine No Drawing. Application October 3, 1955,
Serial No. 538,263

9 Claims. (Cl. 260—355)

This invention relates to an improved process for the manufacture of ethers of dibenzanthrones and more particularly to an improved process for the alkylation of dihydroxydibenzanthrones.

Vat dyes which are derived from dihydroxydibenzanthrone are of very great commercial importance because of their desirable properties. The most important member of this class is Vat Jade Green, Color Index No. 1101, but a number of others are sold commercially as for example the dye known as Indanthrene Navy Blue G. These dyes are all structurally ethers of dihydroxydibenzanthrone. In the manufacture of this type of dye, the dihydroxydibenzanthrone is first prepared and this is converted to the dyestuff proper by the action of the proper alkylating agent. This alkylation often proceeds more readily when the dihydroxydibenzanthrone is in the form of its alkali metal salt such as the sodium or potassium salt. The metal salt may be prepared and isolated and then converted to the ether but it is conveniently performed in situ in the reaction mixture by the action of an alkaline reagent followed, without isolation, by reaction with the alkylating agent. This is usually done commercially by heating a mixture of dihydroxydibenzanthrone press cake with potassium or sodium carbonate in the presence of a solvent such as nitrobenzene. The water which is present is then removed and the alkylation is then carried out by reaction with an alkylating agent such as a dialkyl sulfate or an alkyl arylsulfonate or an alkyl or alkylene halide.

There are many disadvantageous aspects to the process heretofore used, as outlined above. It is a very important disadvantage that the starting material, namely dihydroxydibenzanthrone is unstable and easily oxidized to the corresponding diquinone. The latter material is a most undesirable contaminant in the final product since it reduces in the vat solution to the dihydroxy compound and the resulting dyeings are sensitive to alkali and erratic in color. Dihydroxydibenzanthrone has a much more blue shade than its alkylated derivatives and, furthermore, is sensitive to the presence of acid or bases, acting as an indicator. To prevent formation of the diquinone, reducing agents such as formaldehyde sulfoxylate have been added to the reaction mixture but this not only is an added expense but causes difficulties in the alkylation.

It is a further disadvantage of the previous methods that because alkylation may be incomplete, it is necessary to remove partially alkylated materials by treatment with alkaline agents, thus adding the further cost of an extra step. If this is not done, the incomplete alkylation makes the matching of shades from one batch to the next very difficult.

It is a still further disadvantage of the previous methods of alkylating dihydroxydibenzanthrone that the removal of water from the reaction mixture by azeotropic distillation, after the alkali metal has been formed, causes the dihydroxydibenzanthrone salt to cake and to form lumps. This is one of the reasons why there is insufficient alkylation, since the dihydroxydibenzanthrone is then insufficiently dispersed for complete and easy alkylation. To avoid this disadvantage it has been proposed to mill the dibenzanthrone derivative before it is used in the reaction, but this again adds an extra step with added expense.

We have now found that complete alkylation of dihydroxydibenzanthrone can be readily obtained by conversion of the dihydroxydibenzanthrone to the salt of a volatile amine, removing the water from the reaction mixture and then converting the amine salt to the corresponding alkali metal salt by the addition of an alkaline reagent. Distillation then removes the amine, to be reused, and the dihydroxydibenzanthrone alkali metal salt is in the solvent in a very dispersed form which is readily and completely alkylated and shows no tendency to oxidize to the diquinone.

In the practice of my invention at least a substantially stoichiometric amount of a volatile amine is added to the dihydroxydibenzanthrone in an organic solvent. A small excess of amine is sometimes to an advantage. While larger amounts may be used without deleterious effects, they are usually not necessary. While slightly less than stoichiometric amounts give some improvement, it is better to have an excess than an insufficient amount. The volatile amine may be any amine which is sufficiently basic to form a salt with dihydroxydibenzanthrone and sufficiently volatile to be distilled from the solvent before alkylation. As a class the volatile aliphatic amines are most suitable, examples of which may be triethylamine, diethylamine, tributylamine, amylamine and the like. Because of ready availability, strong basicity and high volatility, I particularly prefer to use triethylamine.

The organic solvents which may be used in this reaction are those which possess some ability to dissolve dihydroxydibenzanthrone and its derivatives. Particularly useful are such aromatic solvents trichlorobenzene, orthodichlorobenzene, and nitrobenzene.

In my process it is preferable to use the wet filter cake of dihydroxydibenzanthrone as isolated in order to save the added cost of drying since the drying can be carried out in the process of alkylation. Consequently, there is usually water present at the start when my process is carried out. After the amine salt has been formed, the temperature of the reaction mixture is raised sufficiently high to drive off the water as an azeotrope. The mixture is then cooled and an alkaline acid-binding reagent such as sodium or potassium carbonate or bicarbonate is then added. The temperature of the reaction mixture is then raised to about 160° C., whereby the amine is distilled out and recovered for reuse. This temperature will depend upon the properties of the amine to be removed but with the more common aliphatic amines this is found to be sufficient.

When the amine has been removed, a very fine dispersion of the dihydroxydibenzanthrone alkali metal salt in the solvent remains. The alkylating agent is then added and the alkylation is carried out at temperatures from about 135° to above 200° C., depending on the nature of the alkylating agent.

The alkylating agents which may be used include all the various types which have previously been suggested for the alkylation of dihydroxydibenzanthrone. These include the dialkyl sulfates such as dimethylsulfate and diethylsulfate, various alkyl aryl sulfonates such as methyl and ethyl toluene sulfonates, alkyl and aralkyl benzene sulfonates such as methyl, ethyl, benzyl, chlorethyl benzene sulfonates and the like, glycol dibenzene sulfonates such as ethylene or propylene glycol dibenzene sulfonates and the like, alkyl halides such as ethylbromide, ethyliodide, propyl bromide, etc., and alkylene dihalides such as ethylenedichloride or propylene dibromide. Mixtures of alkylating agents are also usable such as the mixed esters of p-toluene sulfonic acid or the mixtures of o- and p-toluene sulfonic acids. The nature of the alkylating agent is not a critical portion of the process of my invention, and any of the alkylating agents heretofore suggested may readily be used.

While the exact mode of action of the volatile amine in making the process of my invention so advantageous is not clear, it is believed that the following is the theoretical explanation. I do not wish however to be limited to this theory. It is believed that when the amine is added to the dihydroxydibenzanthrone in the organic solvent an amine salts forms. While a small amount of the amine may be removed with the water when the mixture is heated to distill out the azeotrope, most of the amine is driven off after the addition of the alkaline acid-binding agent. The amine must be added to the mixture before the acid binding agent is added. In fact, the presence of any stronger base than the amine will prevent the formation of the amine salt. It is therefore necessary in the process of my invention to add the amine in the absence of any stronger base than itself, and the addition of the alkali metal salts must be carried out at a later stage. Amines have sometimes been added to dihydroxydibenzanthrone mixtures which already contained carbonates or other acid binding agents and our invention is not to be confused with such a process, since an addition of the amine at such a step will not produce the fine dispersion and therefore the complete alkylation which the process of my invention produces.

While the above discussion has been directed to dihydroxydibenzanthrone itself, the process of my invention is equally usable for the alkylation of substituted dihydroxydibenzanthrone, since the same problems and disadvantages are met in alkylating them. Among the other compounds which can be used in the process of my invention are, dihydroxy-6,6'-dichlorodibenzanthrone, dihydroxy-7,7'-dimethyldibenzanthrone and dihydroxy dinaphthodibenzanthrone.

It is an advantage of the process of my invention that there is provided a one-step process for the alkylation of dihydroxydibenzanthrone which achieves complete alkylation without the danger of oxidation to diquinone. This is most surprising since the amine is ordinarily removed from the reaction mixture before the alkylating agent is added. It is not understood why the dihydroxydibenzanthrone cannot at this point oxidize but experimentally it has been found that such oxidation does not occur to any appreciable extent and alkylation is quite readily achieved.

It is a still further advantage on the process of my invention that the alkylation can be carried out with the consumption of less reagents. It is especially to be noted that I have found that less alkylating agent is necessary to obtain a good alkylation when the process is carried out by my method. In addition to the cost factor, this is important from a safety standpoint when a hazardous, toxic reagent such as dimethylsulfate is involved. In addition, various purification steps are obviated with consequent savings in the cost of production.

It is a still further advantage of my invention that the process does not involve mechanical difficulties such as have been encountered in the previous methods used. There is no caking or lumping of the dihydroxydibenzanthrone which is readily dispersed in a fine dispersion by the use of the amine salt. The formation of the amine salt also permits the excess water to be removed very smoothly by azeotropic distillation.

My invention can be further illustrated by the following examples in which parts are by weight unless otherwise specified.

*Example 1*

A mixture of 15 parts Bz-2, Bz-2'-dihydroxydibenzanthrone and 170 parts of concentrated sulfuric acid is stirred until solution is complete. The mixture is drowned in 1,300 parts of water and 6 parts of sodium metabisulfite is added. The mixture is heated to the boil and the solid material is removed by filtration and washed with water until acid-free.

The wet filter cake is added to 200 parts of nitrobenzene together with 7.2 parts of triethylamine. The mixture is then gradually heated to about 170° C. and water distills out together with a small amount of amine and solvent. The resulting completely fluid mixture is then cooled to room temperature and 27 parts of dry anhydrous potassium carbonate is added. The temperature is gradually increased to about 160° C. After the amine has been removed, 18 parts of dimethylsulfate is then slowly added to the mixture which remains fluid and easily stirrable. The mixture is stirred until alkylation is complete. It is then cooled to room temperature and the solid is removed by filtration. After it is washed with nitrobenzene, it is steam stripped to remove organic solvents, washed free of alkalinity, and dried. An excellent yield of dimethoxydibenzanthrone of high quality is obtained.

*Example 2*

The procedure of Example 1 is followed except that no amine is used. The potassium carbonate is added directly to the slurry of dihydroxydibenzanthrone in nitrobenzene. When the mixture is heated to 160° C. to distill out the water the mixture turns green with much caking on the walls of the reaction vessel even though more potassium carbonate is added and the mixture is stirred for a number of hours with dimethylsulfate, alkylation is not complete. Even the use of excess dimethylsulfate and considerably more reaction time fails to complete the alkylation. The product shows a strong test for free hydroxyl groups.

*Example 3*

The procedure of Example 1 is followed except that an equivalent quantity of sodium carbonate is used in place of the potassium carbonate.

*Example 4*

The procedure of Example 1 is followed except that an equivalent quantity of tripropylamine is used in place of the triethylamine.

*Example 5*

A mixture of 298 parts of nitrobenzene, 25 parts of Bz-2, Bz-2'-dihydroxydibenzanthrone and 12.4 parts of triethylamine is heated with stirring to about 170° C. It is kept at this temperature until all the excess triethylamine has distilled out. To the mixture is then added, as rapidly as possible 25 parts of anhydrous sodium carbonate; the liberated triethylamine is then removed by further distillation and when this removal is complete, 70 parts of ethylene glycol dibenzenesulfonate is added. The mixture is then heated with stirring for a short period at about 180° C. and finally at about 205° C., until the reaction is substantially complete. The mixture is cooled and the solid is removed by filtration and washed with nitrobenzene. It is then suspended in water and subjected to steam distillation until free of organic solvent. The product is finally collected, washed with water and dried, giving an excellent yield of high quality dye.

*Example 6*

The procedure of Example 1 is followed using an equivalent quantity of dihydroxy-6,6'-dichlorodibenzanthrone. An excellent yield of 6,6'-dichlorodimethoxydibenzanthrone is obtained.

*Example 7*

The procedure of Example 1 is followed using an equivalent amount of dihydroxy-7,7'-dimethyldibenzanthrone. An excellent yield of dimethoxy-7,7'-dimethyldibenzanthrone is obtained.

Example 8

The procedure of Example 1 is followed using an equivalent quantity of dihydroxydinaphthodibenzanthrone. An excellent yield of the resultant dimethoxydinaphthodibenzanthrone is obtained.

I claim:

1. The process for the alkylation of a dihydroxydibenzanthrone which comprises suspending the dihydroxydibenzanthrone in an inert organic solvent, adding to said suspension at least a substantially stoichiometric quantity of a volatile aliphatic amine, adding thereto at least a substantially stoichiometric quantity of an alkali metal carbonate, removing the liberated aliphatic amine by distillation and heating the alkali metal salt of the dihydroxydibenzanthrone with at least a substantially stoichiometric quantity of an alkylating agent.

2. The process of claim 1 in which the dihydroxydibenzanthrone is Bz-2, Bz-2′-dihydroxydibenzanthrone.

3. The process of claim 1 in which the amine is triethylamine.

4. The process of claim 1 in which the acid binding agent is sodium carbonate.

5. The process of claim 1 in which the acid binding agent is potassium carbonate.

6. The process of claim 1 in which the alkylating agent is dimethylsulfate.

7. The process of claim 1 in which the alkylating agent is ethylenegylcol dibenzene sulfonate.

8. The process of claim 1 in which the alkylating agent is methyl toluene sulfonate.

9. The process of claim 1 in which water is removed by heating before the addition of the alkali metal carbonate.

No references cited.